United States Patent [19]
Bradt

[11] 3,731,644
[45] May 8, 1973

[54] CATAMARAN VESSEL AND SYSTEM FOR LOADING AND UTILIZING A CAMPER OR TRAILER THEREON

[76] Inventor: Robert D. Bradt, 7274 Canyon Crest, Whittier, Calif. 90602

[22] Filed: May 12, 1971

[21] Appl. No.: 142,669

[52] U.S. Cl. ..................114/61, 9/1 TR, 214/85.1
[51] Int. Cl. ..............................................B63b 1/00
[58] Field of Search......................9/1 TR; 115/.5 A, 115/.5 B; 214/85.1; 114/61

[56] References Cited

UNITED STATES PATENTS

| | | | |
|---|---|---|---|
| 2,199,186 | 4/1940 | Quintana | 115/.5 |
| 3,101,692 | 8/1963 | Snow | 114/61 |
| 3,193,321 | 7/1965 | Rose | 280/414 R |
| 3,201,144 | 8/1965 | Smyser | 214/85.1 |
| 3,335,437 | 8/1967 | Judkins | 9/1 TR |

*Primary Examiner*—Milton Buchler
*Assistant Examiner*—Stuart M. Goldstein
*Attorney*—Philip M. Hinderstein

[57] ABSTRACT

A catamaran vessel adapted to receive a pickup truck camper body or a house trailer is provided with a detachable bow ramp and a stern pylon. A winch supporting dolly is connected to the socket hitch of the trailer or a wheeled frame supporting a camper. The winch cable is attached to the pylon and the winch used to pull the camper or trailer up the detachable bow ramp onto the deck. The forward control podium of the vessel swings out of the way during such loading. The socket hitch then is connected directly to the pylon to maintain the camper or trailer in place, and utility modules on the vessel are connected to the camper or trailer to allow it to be utilized while on board. These modules include, within one catamaran hull, a waste water holding tank which also serves as ballast if the camper or trailer is located off-center of the vessel. The fiberglass hulls of the vessel include outwardly flanged upper edges to which are bolted deck panels comprising a polyurethane core sandwiched between fiberglass or laminated wood sheets.

9 Claims, 8 Drawing Figures

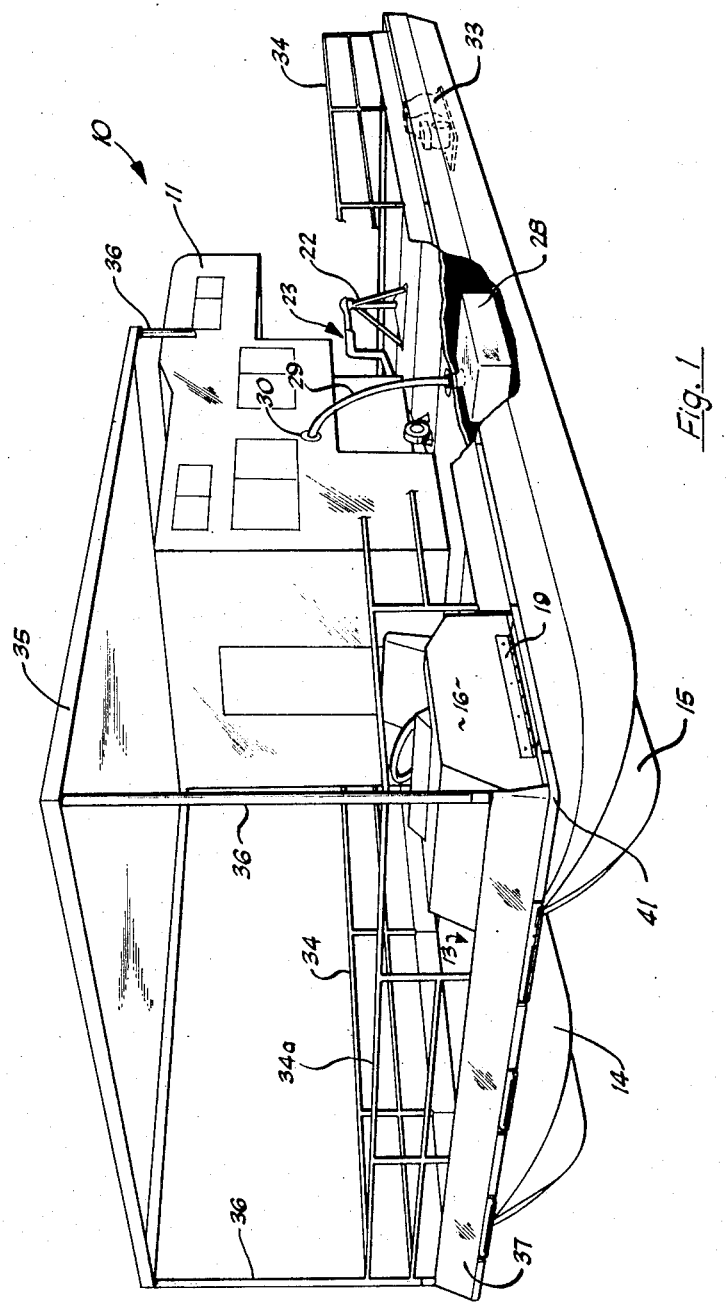

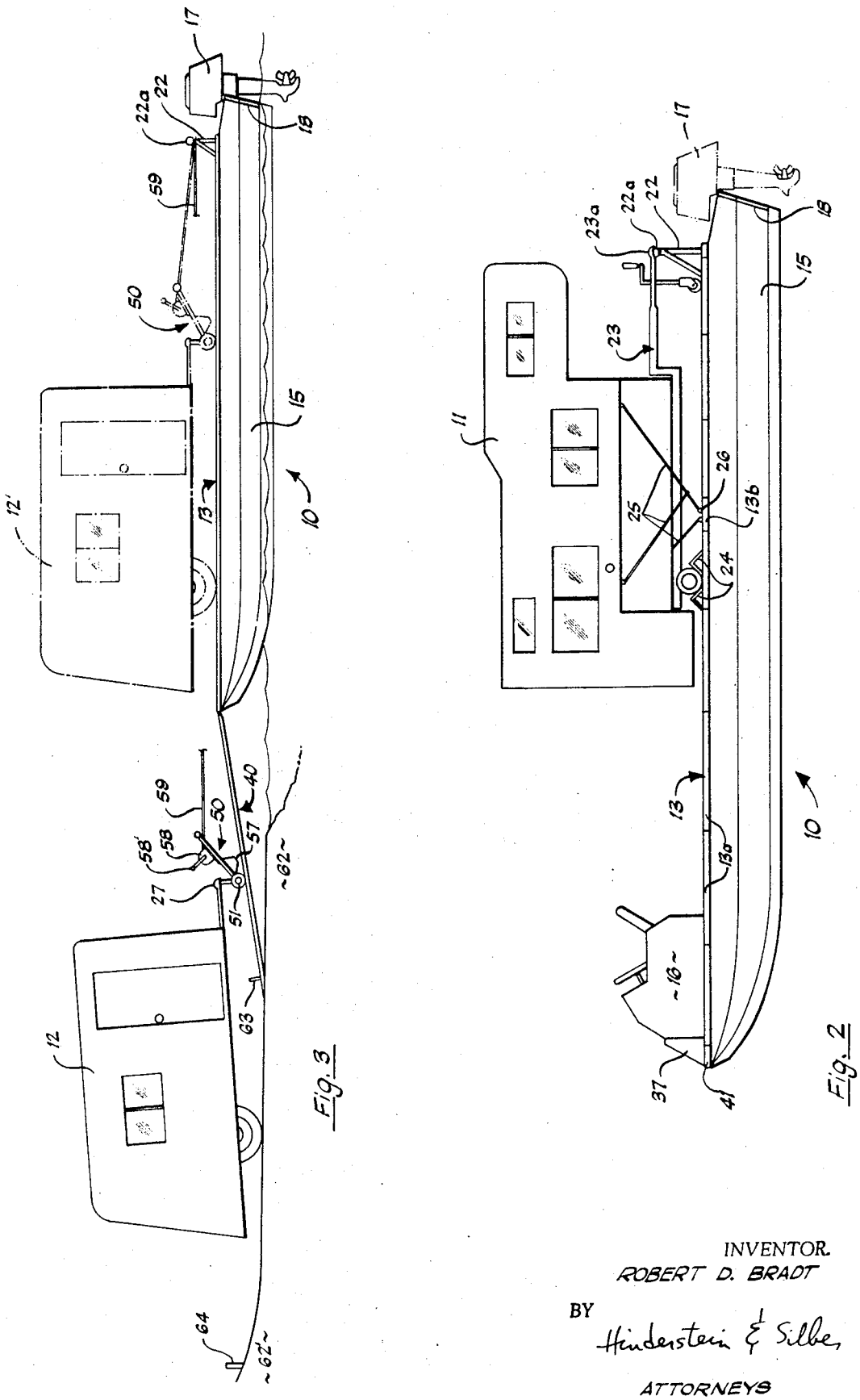

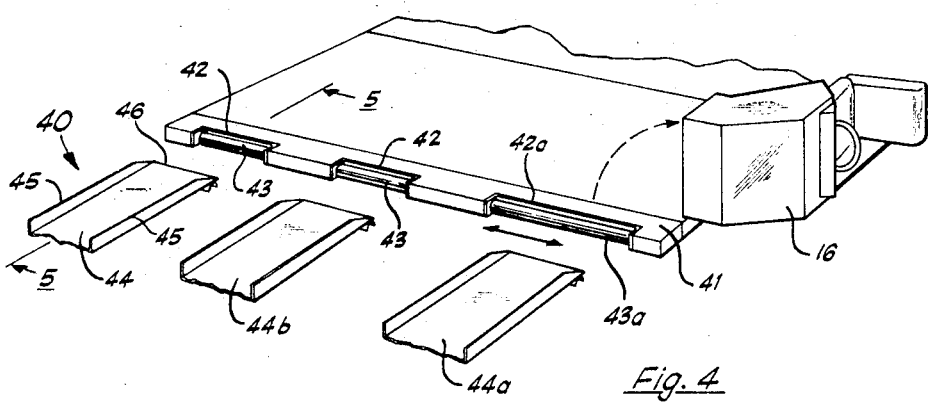
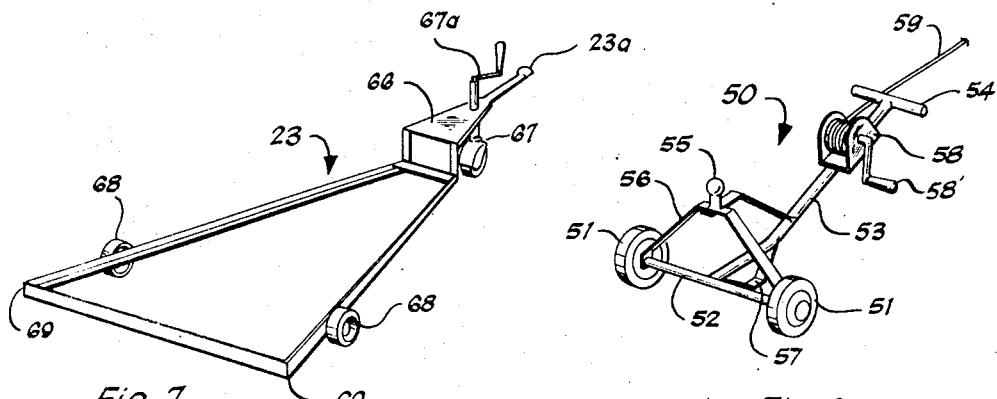
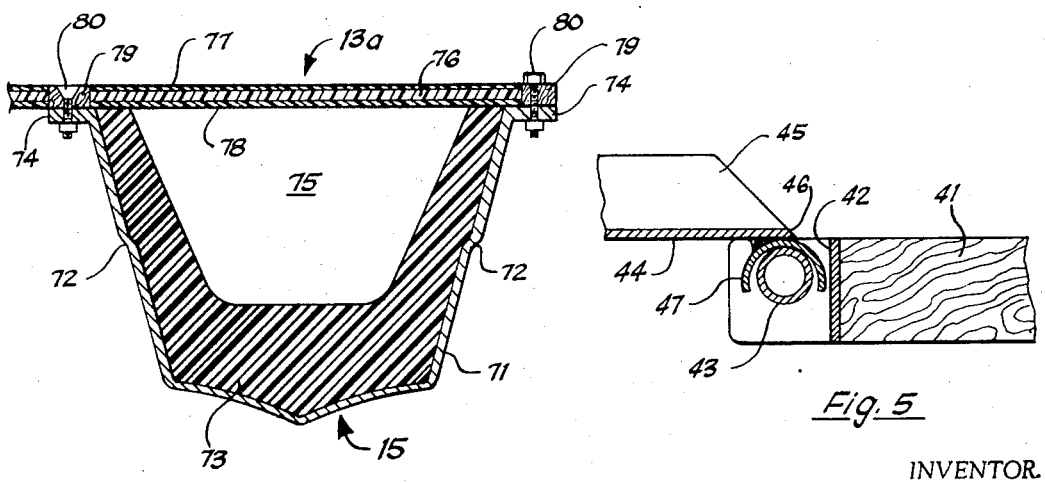
INVENTOR.
ROBERT D. BRADT 3,731,644

CATAMARAN VESSEL AND SYSTEM FOR LOADING AND UTILIZING A CAMPER OR TRAILER THEREON

BACKGROUND OF THE INVENTION

1. Field of the Invention

The present invention relates to a catamaran vessel which becomes a houseboat when a pickup truck camper body or a house trailer is mounted thereon, and to systems for across-the-bow loading of the camper or trailer and for providing utilities to the camper or trailer when on the vessel.

2. Description of the Prior Art

In recent years, the use of pickup truck campers and house trailers has gained widespread popularity. Such mobile campers and trailers, with their self-contained sleeping, kitchen and toilet facilities, make family vacations convenient and inexpensive. Increasingly, such camper or trailer vacations are taken to the seashore, or to a lake or river offering water recreation facilities. Once there, however, the camper or trailer must be left ashore, perhaps in favor of renting a houseboat or other vessel with its own sleeping and related facilities.

Various amphibious systems have been suggested in the past to facilitate aquatic use of a camper. Thus the U. S. Pat. No. 3,414,916 to J. A. Martin discloses a pickup truck camper provided with a pair of pontoon structures transported atop the camper when on land. To use the camper as a boat, the pontoon structures are attached beneath the camper body. Flotation elements within each pontoon are inflated with air to provide the buoyancy necessary to support the camper. Another conversion system is shown in the U. S. Pat. No. 3,436,774 to W. B. Schmitz. In that system, the camper body first is jacked up off the ground, and a deck module affixed to the camper bottom. A pair of catamaran hulls, each with an associated hull bracing truss, are secured beneath the deck module to form a watercraft.

While amphibious conversion systems permit a camper to be used afloat, transportable pontoon structures are bulky, difficult to assemble, and represent considerable expense to a camper owner who only occasionally wishes to convert his camper to a houseboat.

A more attractive approach is to provide a boat onto which a camper or trailer could be loaded. Such a vessel might be owned, for example, by a marina and leased to a vacationer on a daily or weekly basis. This would permit houseboat utilization of the camper or trailer without the expense of owning, or inconvenience of transporting, an amphibious conversion apparatus.

One prior art boat for house trailers is shown in the U. S. Pat. No. 3,265,025 to A. A. Haigh. Therein is provided a single hulled vessel including a hinged stern ramp across which a trailer is rolled onto a lower deck. A movable, raised deck structure surrounds the trailer at door level.

While providing a reasonable aquatic platform for a trailer, stern loading is disadvantageous because it requires backing the vessel close in to shore. In shallow waters, the propeller thus is likely to become grounded. This problem is particularly acute since most often the trailer owner will be an inexperienced sailor. If the propeller or outboard motor is swung out of the water, no power would be available to back the boat up to the shore for loading or unloading. Another disadvantage of stern loading is the hazard of the camper or trailer striking and causing damage to the engine.

A motorized float for supporting pickup truck campers is shown in the U. S. Pat. No. 3,335,437 to A. B. Judkins. Here a catamaran structure is used, providing inherently more stability than a single hulled vessel. A retractable cantilever mechanism is provided for loading a camper across the bow onto the vessel. While bow loading overcomes the disadvantages of stern loading discussed above, a cantilever loading mechanism is complex, is useful only for camper bodies, and requires that the shore or dock from which the camper is loaded be substantially horizontal and on a level with the vessel deck, and requires that each boat be equipped with the loading mechanism.

Nowhere in the prior art is there disclosed a catamaran vessel adapted to support either a pickup truck camper body or a house trailer, having simple means for loading either a camper or trailer across the bow from a level or inclined bank or dock, and having on-board utilities connectable to the camper or trailer to allow its utilization while on board and afloat.

SUMMARY OF THE INVENTION

In accordance with the present invention, there is provided a catamaran vessel adapted to support a pickup truck camper body (herein referred to as a "camper") or a house, travel or tent trailer (herein, a "trailer"). The vessel is provided with a detachable bow ramp and a stern pylon. To load the camper or trailer, a winch supporting dolly is connected to the socket hitch of the trailer or to a wheeled frame supporting the camper. The winch cable is attached to the pylon on the vessel, and the winch used to pull the camper or trailer up the bow ramp onto the deck. The forward control podium of the vessel swings out of the way during such loading. The socket hitch then is connected directly to the pylon, to maintain the camper or trailer in place on the vessel.

The vessel itself preferably comprises a pair of partially hollow hulls having outwardly flanged upper edges to which are attached the deck members. Within one hull is provided a waste water holding tank which also serves as ballast if the camper or trailer is mounted off-center on the vessel. The disposal tank and other utility modules on the vessel are connectable to the camper or trailer.

Thus it is an object of the present invention to provide a catamaran vessel configured for simplified loading, unloading, attachment, support, and utility connection for complete functioning of a camper or trailer.

BRIEF DESCRIPTION OF THE DRAWINGS

Detailed description of the invention will be made with reference to the accompanying drawings wherein like numerals designate like parts in the several figures. The drawings, unless indicated as diagrammatic, are to scale.

FIG. 1 is a perspective view of the inventive catamaran vessel supporting a camper.

FIG. 2 is a side elevational view of the catamaran vessel shown in FIg. 1, but with the canopy and side rails removed.

FIG. 3 is a diagrammatic view showing the inventive system for loading or unloading a trailer or camper from the catamaran vessel.

FIG. 4 is a fragmentary perspective view of the detachable bow ramp used for loading a camper or trailer onto the vessel of FIG. 1, and showing the control podium swung out of the way to facilitate such loading.

FIG. 5 is a fragmentary sectional view of the bow ramp, as seen generally along the line 5—5 of FIG. 4.

FIG. 6 is a perspective view of a dolly and attached winch useful for loading a camper or trailer onto the vessel of FIG. 1.

FIG. 7 is a perspective view of a wheeled supporting frame for a pickup truck camper body.

FIG. 8 is a transverse sectional view of one hull of the vessel of FIG. 1, illustrating the manner of attachment of the deck members.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention best is defined by the appended claims.

Referring now to the drawings, and particularly to FIGS. 1, 2 and 3 thereof, there is shown a catamaran vessel 10 adapted to support either a pickup truck camper body 11 or a house trailer 12. The vessel 10 includes a planar deck structure 13 attached directly to a pair of partially hollow hulls 14, 15. A control podium 16 is situated adjacent a forward corner of the vessel 10, and includes steering, power and other controls for operating one or more conventional outboard engines 17 mounted on an aft transom bridge 18. The control podium 16 is pivotally mounted to the vessel 10, as by a piano hinge 19 along the outboard edge, permitting the podium to be swung out of the way (as shown in FIG. 4) during loading or unloading of a camper or trailer.

Rigidly affixed to the deck structure 13 near the stern of the vessel 10 is a pylon 22 of adjustable height, and having a standard trailer hitch ball 22a at the upper end thereof. As evident in FIGS. 1, 2 and 7, the socket hitch 23a of a wheeled frame 23 supporting the camper 11 is attached to the pylon ball 22a to secure the camper 11 to the vessel 10. Wheel chocks 24 and tie-downs 25 connected to deck mounted eyelets 26 further secure the camper 11 to the vessel 10. When a trailer 12 (FIG. 3) is employed, the trailer hitch socket 27 is connected to the pylon ball 22a to affix the trailer 12 to the vessel 10.

Situated within the hull 15 (FIG. 1) is a waste water holding tank 28 which may be connected via a flexible hose 29 to the waste water outlet 30 of the camper 11 or trailer 12. Cans of fresh water (not shown) may be stored within the hull 15 or on the deck 13. Similarly, a 110 volt ac electrical generator 33 may be mounted on the deck 13 or in the hull 15, and connected to provide electrical power to the camper 11 or trailer 12. The utility modules within the hull 15 further act as ballast to improve the lateral weight distribution should the camper 11 or trailer 12 be mounted off-center on the deck 13. The 12-volt dc electrical system of the engine 17 also may be connected to the camper 11 or trailer 12 to provide electrical power thereto.

As shown in FIG. 1, the vessel 10 includes detachable guard rails 34 which plug into female receptacles in the deck members 13. A canopy 35 is supported by stanchions 36 which likewise are detachably inserted into appropriate receptacles in the deck structure 13. A forward spray shield 37 is clip connected to the deck structure 13, and may be removed, together with the forward guard rail 34a, to permit across the bow loading or unloading of the camper 11 or trailer 12.

The vessel 10 is provided with a bow loading ramp assembly 40 best illustrated in FIGS. 4 and 5. As seen therein, the forward deck member 41 of the vessel 10 is recessed to receive three generally U-shaped brackets 42 each horizontally supporting a cylindrical ramp receiving member 43. The ramp assembly 40 further includes three planar ramp members 44, 44a, 44b each having flanged longitudinal edges 45 to prevent the trailer or camper frame wheels from slipping off. The port recess 42a and cylindrical member 43a are wider than the corresponding ramp member 44a. This permits lateral adjustment of the ramp member 44a to accommodate campers or trailers of different wheel base. Alternatively, each recess 42 may be wider than the corresponding ramp member 44.

Attached across the underside of one end 46 of each ramp member 44 is a downwardly opening, generally hemicylindrical member 47 of diameter greater than that of the cylindrical member 43. This arrangement permits each ramp member 44 to be attached to the deck structure 13 by simply straddling the hemispherical member 47 over the cylinder 43, as shown in FIG. 5. This arrangement permits wide variation in the angle at which the ramp members 44 meet the deck 13, to accommodate loading or unloading from a shoreline or dock which is either lower than, horizontal with, or downwardly inclined toward the deck of the vessel 10.

To facilitate actual loading and unloading of a camper or trailer, there is provided a dolly 50 best shown in FIG. 6. The dolly 50 includes a pair of wheels 51 spaced less than the width of the center ramp member 44b, and attached at the ends of a crossbar 52. The crossbar 52 is connected transversely across the lower end of a shaft 53 having a handle 54 at the upper end. A standard trailer hitch ball 55 is supported above the crossbar 52 on a frame 56 having three legs extending respectively from the ends of the crossbar 52 and the mid-section of the shaft 53. A stand foot 57 of inverted-U-shape extends below the lower end of the shaft 53. The stand foot 57 also acts as an emergency traction brake during loading and unloading. A winch 58 having a cable 59 is attached to the dolly 50 near the upper end of the shaft 53. Other winching arrangements also may be used.

To load the trailer 12 onto the deck 13, the vessel 10 is positioned with the bow facing the shore 62, or dock, and the ramp members 44 are set in place on the receiving members 43, as shown in FIGS. 3 and 5. The lower end of each ramp member is situated on the shore. The dolly 50 is connected to the trailer 12 by hitching the socket 27 to the ball 55. The dolly 50 is used to pull the trailer 12 to the ramp 40. The cable 59 is attached to the pylon 22 at the stern of the vessel 10. The crank handle 58' next is used to wind the cable 59 onto the winch 58, to pull the trailer 12 up the ramp 40 and onto the deck 13, as shown in phantom at 12'. Traction brake use of the dolly foot 57 aids in controlling the trailer 12 during loading. Once on the deck, the dolly 50 is disconnected from the trailer 12, and the trailer hitch socket 27 is connected directly to the pylon 22.

A similar procedure may be used to unload the trailer 12 from the vessel 10. If the shore 62 should be at a level above that of the deck 10, unloading can be assisted by connecting the winch cable 59 to a pop-up pin 63 provided near the shore end of the central ramp member 44b. Further, a post or stake 64 may be placed at the top of an incline 62' and the dolly 50 and winch 59 used to pull the trailer 12 up the incline.

Similarly, loading of the camper 11 is facilitated by use of the dolly 50 in conjunction with the wheel supporting frame 23. As seen in FIG. 7, the frame 23 is of generally triangular construction, having a vertically offset section 66 adjacent the forward apex. A castor wheel assembly 67 including a crank 67a for adjusting the wheel height is attached to the offset section 66, as is the trailer socket hitch 23a. Further, the frame 23 includes a pair of wheels 68 adjacent the other two frame apices 69, and mutually spaced by greater than a width dimension of the camper 11. Appropriate fittings, not shown, may be provided on the frame 23 for attachment to the bottom of the camper 11. A conventional hoist (not shown) may be used to lift the camper body from a pickup truck onto the frame 23, and the dolly 50 then used to load the camper 11 and frame 23 onto the vessel 10.

The hull and deck construction of the catamaran vessel 10 is illustrated in FIG. 8. The hull 15, which is identical to the hull 14, comprises an outer shell 71 of molded fiberglass or the like, and having longitudinal wrinkles 72 for added strength. A portion 73 of the hull interior is filled with polyurethane or like plastic foam for improved strength and buoyancy. The upper peripheral edges 74 of the hull 14 are outwardly flanged to facilitate attachment thereto of the planar deck members 13a and 13b (FIG. 2). A region 75 interior of hull 15 is hollow and thus may be used for storage, mounting of the disposal tank 28 and the like. Moreover, this arrangement makes the hulls nestable, thereby simplifying their transport and storage.

Each deck member 13a may include a central core 76 (FIG. 8) of polyurethane or other like material sandwiched between outer sheets 77, 78 of fiberglass or laminated wood. Appropriate bolts 80 or like fasteners extend through the compression blocks 79 and the respective hull flanges 74 to secure the deck member 13a to the hull. Note that the narrower deck members 13b (FIG. 1) may be fabricated of wood.

An alternative deck member embodiment (not shown) utilizes wood stringers sandwiched between outer sheets of laminated wood or fiberglass. The space between the outer sheets may be left vacant or filled with polyurethane. The entire sandwich may be wrapped with densely woven fiberglass and resin to provide a protective, non-skid surface. Appropriate bolts or like fasteners extend through the wood stringers and the respective hull flanges 74 to secure the deck members to the hull.

Thus there is provided a catamaran vessel of simple construction well adapted to receive a camper or trailer, and systems for loading or unloading the trailer and for providing utilities to the camper or trailer while on board.

I claim:

1. A system for utilizing a conventional camper of the type mounted on a truck body as a houseboat, comprising:

a vessel having a hull supported deck structure;

a pylon mounted on said vessel adjacent the stern thereof;

ramp means detachably connected to the bow of said vessel;

a wheeled frame for supporting said camper when removed from said truck, said frame being generally triangular and including a vertically offset section adjacent one apex, a pair of wheels being attached to said frame adjacent the other two apices and mutually spaced by greater than a width dimension of said camper, said offset section including a third wheel and adjacent said apex, a socket hitch, said non-offset portion only being disposed to fit beneath said camper in attached supporting relationship therewith; and a wheeled dolly including a winch and cable, said dolly being attachable to said wheeled frame, said cable being attachable to said pylon, whereby winding said cable onto said winch causes said dolly, said frame, and said camper to be transported up said ramp means and onto said deck structure, said frame then being directly hitchable to said pylon.

2. A system according to claim 1 further comprising:

a waste water holding tank mounted within one of said hulls; and means for connecting the waste water outlet of said camper to said holding tank.

3. A system according to claim 1 wherein said vessel includes a fresh water supply, 28 volt dc and 110 volt ac electrical supplies, and a used water holding tank for utilization of said camper while aboard said vessel.

4. A catamaran vessel adapted to receive thereon a camper or trailer, comprising:

a pair of unitary, partially hollow hulls each having outwardly flanged upper peripheral edges;

a plurality of planar deck members of length substantially equal to the width of said vessel, each deck member being fasteningly attached to said flanged edges;

a detachable ramp for wheeling said camper or trailer across the bow of said vessel onto said deck members, said ramp including at least two planar ramp members each having upwardly flanged longitudinal edges, the underside of one end of each ramp member being provided with a downwardly opening, generally hemicylindrical member, the bow deck member being provided with a number of recesses along the forward edge thereof, a horizontal, ramp attaching cylindrical member being disposed in each such recess, the hemicylindrical member of each ramp member engaging the corresponding cylindrical member to attach said ramp to said vessel; and means for securing said camper or trailer to said vessel.

5. A catamaran vessel according to claim 4 wherein mounted on said deck members or within a hull are utility services facilities connectable to said camper or trailer, said facilities further providing ballast for said vessel when said camper or trailer is situated on said vessel but offset from the longitudinal centerline thereof.

6. A catamaran vessel adapted to receive thereon a camper or trailer, comprising;
   a pair of partially hollow hulls;
   a planar deck structure disposed between said hulls, said camper or trailer adapted to be positioned on said deck structure and situated laterally off center, substantially above one of said hulls;
   a waste water holding tank positioned within the other of said hulls, whereby said waste water holding tank acts as ballast for said catamaran vessel; and
   means for connecting the waste water discharge outlet of said camper or trailer to said holding tank.

7. A catamaran vessel as defined in claim 6 further comprising:
   at least one water supply tank positioned within or upon said other of said hulls; and
   means for connecting said supply tank to the water inlet of said camper or trailer, said supply tank cooperating with said waste water holding tank in acting as ballast for said vessel when said camper or trailer is situated laterally off center on said deck structure.

8. A catamaran vessel as defined in claim 6 further comprising:
   a source of electricity; and
   means for connecting said source to said camper or trailer to provide electricity thereto, thereby facilitating utilization of said camper or trailer while on board said vessel.

9. A catamaran vessel adapted for conversion to a houseboat by the loading thereon of a pickup truck camper body or a house trailer, comprising;
   a pair of partially hollow hulls each having outwardly flanged upper edges and fabricated of fiberglass,
   a planar deck structure disposed between said hulls and comprising a plurality of deck members each having a core material sandwiched between planar sheets, each deck member being fastened to said hull outwardly flanged edges,
   a control podium situated adjacent the bow of said vessel atop said deck structure, and adapted to pivot about a horizontal axis to enable bow loading of said camper or trailer,
   a pylon affixed to said deck structure adjacent the stern of said vessel, said pylon being of adjustable height and including at the top thereof a trailer hitch ball,
   a bow ramp assembly including a forward deck board having a plurality of ramp attachment members recessed in the forward edge of said board, and a like plurality of ramps each having means at one end for connection at an adjustable angle to the corresponding ramp attachment member, and
   a wheeled dolly adapted to be pulled up said ramp assembly, and including a trailer hitch ball for connection to said camper or trailer, and a winch and cable for attachment to said pylon, said dolly connected camper or trailer being pulled across said bow ramp assembly onto the deck of said vessel by use of said winch and pylon attached cable.

* * * * *